United States Patent [19]
Brown et al.

[11] 4,270,577
[45] Jun. 2, 1981

[54] AIR FLOW DEVICE

[75] Inventors: Carlton E. Brown; Walter A. Tatham, both of Tucson, Ariz.

[73] Assignee: Environmental Air Products, Inc., Tucson, Ariz.

[21] Appl. No.: 98,678

[22] Filed: Nov. 29, 1979

[51] Int. Cl.³ .................... F15D 1/02; G01F 15/02
[52] U.S. Cl. ............................. 138/39; 73/198
[58] Field of Search ................ 73/198; 138/37, 39

[56] References Cited

U.S. PATENT DOCUMENTS

| | | | |
|---|---|---|---|
| 985,216 | 2/1911 | Sims | 138/39 |
| 1,479,714 | 1/1924 | Herdle | 138/37 |
| 1,513,196 | 10/1924 | Stratman | 138/37 |
| 3,136,700 | 6/1964 | Poppendiek et al. | 138/39 |
| 3,733,898 | 5/1973 | Yamamoto et al. | 138/39 |
| 3,964,519 | 6/1976 | De Baun | 138/37 |
| 4,142,413 | 6/1979 | Bellinga | 138/37 |

*Primary Examiner*—John W. Shepperd
*Attorney, Agent, or Firm*—Eugene Chovanes; Edward Lovett Jackson

[57] ABSTRACT

A spherical-shaped, honeycombed segment for positioning downstream of a bend or turn, in an air flow duct for rapidly returning air flow to a uniform, or predictable, cross-sectional flow.

2 Claims, 14 Drawing Figures

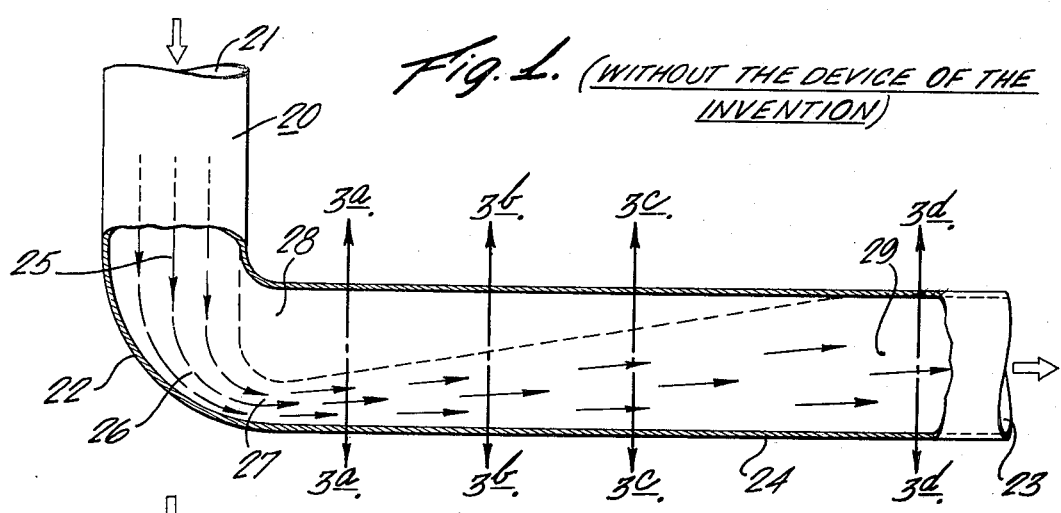
Fig. 1. (WITHOUT THE DEVICE OF THE INVENTION)
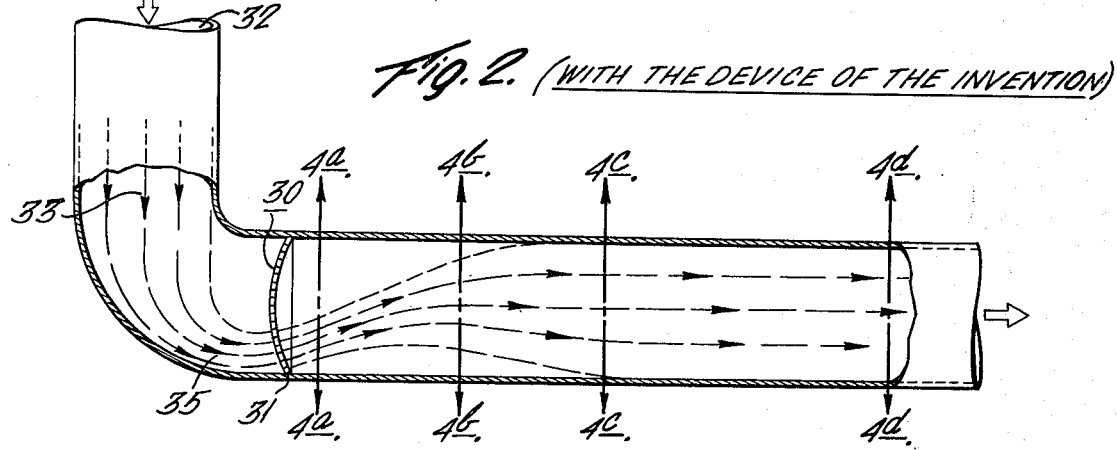
Fig. 2. (WITH THE DEVICE OF THE INVENTION)
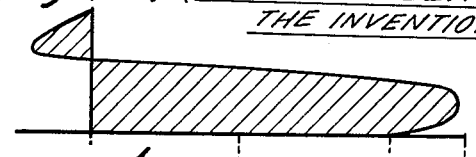
Fig. 3a. (WITHOUT THE DEVICE OF THE INVENTION)
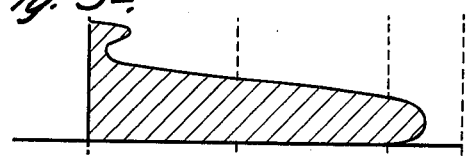
Fig. 3b.
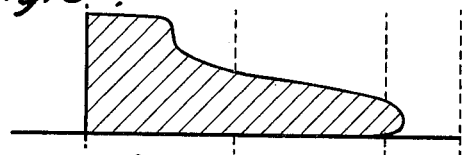
Fig. 3c.
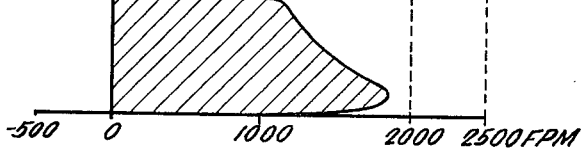
Fig. 3d.
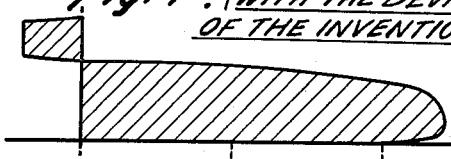
Fig. 4a. (WITH THE DEVICE OF THE INVENTION)
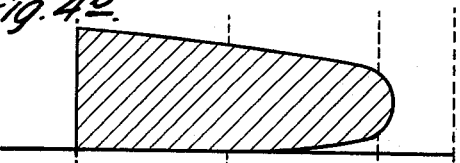
Fig. 4b.
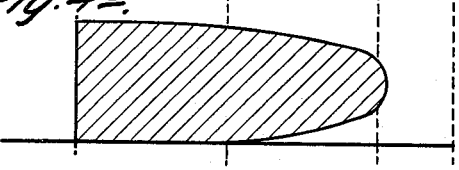
Fig. 4c.
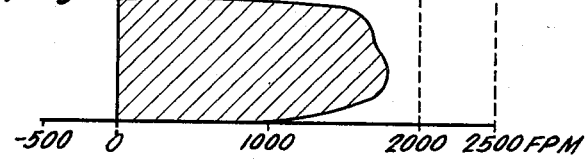
Fig. 4d.

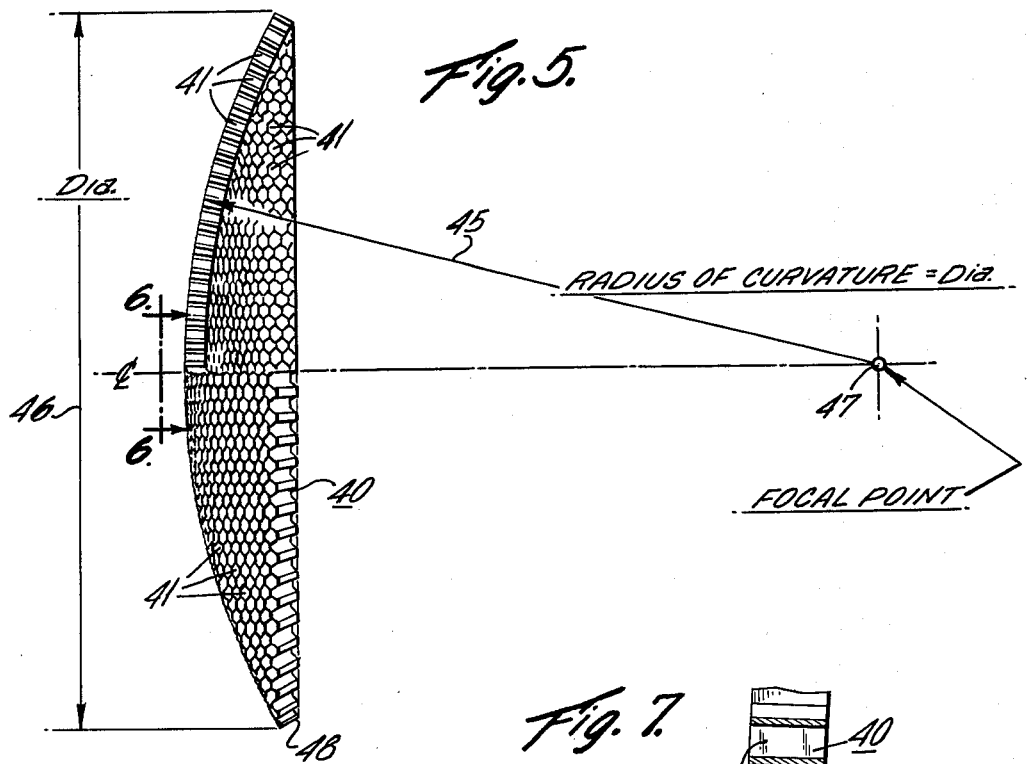
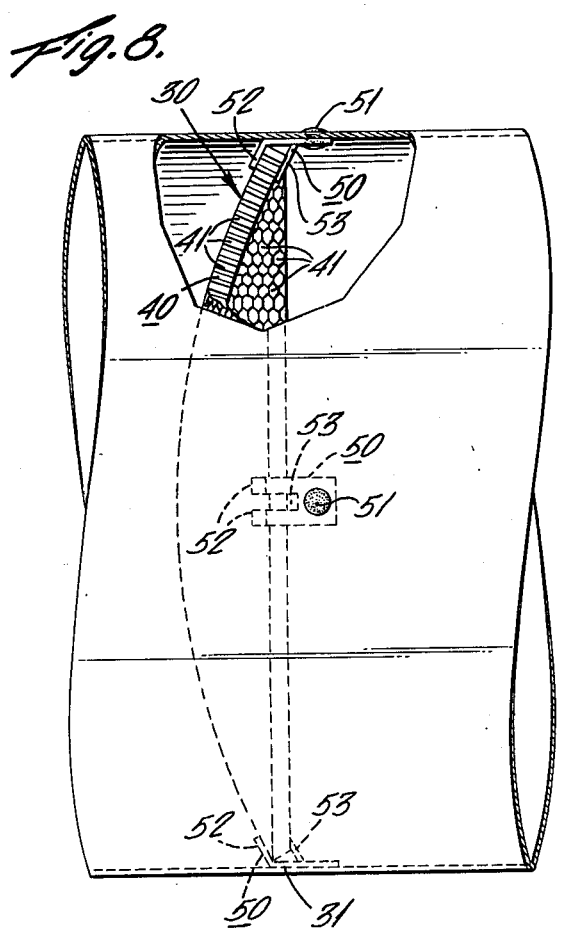
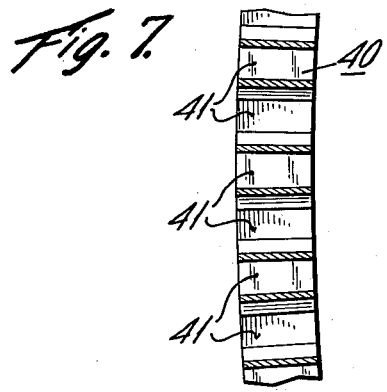
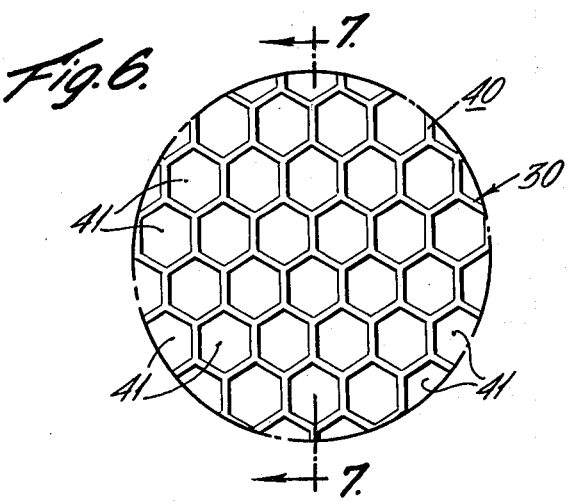

AIR FLOW DEVICE

BACKGROUND OF THE INVENTION

In the movement of air through ductwork in air conditioning systems, it is frequently necessary to determine air velocity at a given point. Velocity sensors such as pitot tubes are used. These sensors require a relatively uniform, or predictable, cross-sectional flow, at the location in the ductwork where velocity determination is being made.

When it is necessary to place bends, such as elbows, or turns, in the ductwork, turbulence is created. In passing through the bend, the air is packed toward the outside of the bend, resulting in non-uniform, cross-sectional flow as the air, with turbulence, exits from the bend. The air flow downstream of the bend then takes some time and distance to return to a relatively uniform, or predictable, cross-sectional flow.

In many instances, it is highly desirable to sense flow close to the bend on the downstream side. For instance, where terminal or mixing boxes are used to selectively mix hot and cool air, and to control flow from a box into a room, it is necessary to sense flow into the box. When turns or bends in the ductwork exist close to the box on the upstream side, as is most frequently the case, a problem occurs, since the bends create turbulence in air flow between the bend and the box, and this prevents accurate flow sensing.

The present invention is concerned with producing uniform, predictable, cross-sectional air flow in a duct relatively close to a bend or turn on the downstream side to permit accurate air flow sensing.

PRIOR ART

In the prior art, efforts were made to keep the air flow uniform in cross section throughout the bend, whereby the problem of non-uniform, or turbulent, flow was prevented from developing.

Such efforts have included angled vanes which are positioned so as to constantly deflect the air by taking each segment of the flow and guiding it throughout the turn.

Honeycombed material has also been used as a means of straightening and directing fluid flow in ducts. The thin web or cell walls of honeycomb provide an array of straight tubes or passages which serve to turn the air as it goes through the bend. See U.S. Pat. No. 3,733,900 for use of such honeycombs.

These prior art devices, in turning the air through the bend, or turn, create resistance to air flow which results in substantial pressure drop. Such drop is undesirable since increased pressures must be used to achieve adequate air distribution in the system.

Furthermore, in constructing ductwork, it is often difficult to predict where turns are necessary and then to install air turning devices within the turns, particularly where the ducts are round in cross section and small in diameter.

Finally, aerodynamic cross-sectional turning vanes are intricate in design and expensive to construct.

SUMMARY OF THE PRESENT INVENTION

In the present invention, the air flow is allowed to pack just as it would without any turning mechanism, in contrast to the prior art. The air flow packs on the outside of the bend, and exits from the bend in an entirely non-uniform cross-sectional flow. Upon exit from the bend, the packed air passes through the device of the invention wherein recovery is rapidly achieved by directing the packed air into a uniform cross-sectional flow.

The air in passing through the passages is directed toward a uniform cross-sectional flow. The present device is a spherical segment of honeycombed material, wherein the longitudinal axes of the numerous passages, or cells, of the honeycomb are focused at a point downstream of the device on the center line of the duct. The radius of curvature of the device is equal to the diameter of the ductwork. The device extends across the entire interior cross section of the duct. In directing the air toward a uniform cross-sectional flow, turbulence is reduced.

BRIEF DESCRIPTIONS OF THE DRAWINGS

FIG. 1 is a fragmentary partial sectional elevational view of air flow in ductwork having a bend therein without the present invention.

FIG. 2 is a view of air flow in the ductwork of FIG. 1, using the device of the present invention.

FIGS. 3a to 3d are graphs showing air flow in the ductwork of FIG. 1.

FIG. 3a shows flow at point 3a—3a in FIG. 1.

FIG. 3b is at point 3b—3b in FIG. 1.

FIG. 3c shows flow at point 3c—3c in FIG. 1.

FIG. 3d shows flow at point 3d—3d in FIG. 1.

FIGS. 4a to 4d are graphs showing the air flow in the ductwork of FIG. 2.

FIG. 4a shows flow at the point 4a—4a in FIG. 2.

FIG. 4b shows flow at the point 4b—4b in FIG. 2.

FIG. 4c shows flow at the point 4c—4c in FIG. 2.

FIG. 4d shows flow at the point 4d—4d in FIG. 2.

FIG. 5 is an elevational view, partially in section, showing the device of the invention including the relative relationship between the radius of curvature of the device and the diameter of the duct.

FIG. 6 is an enlarged partial view taken on the line 6—6 of FIG. 5.

FIG. 7 is a sectional view taken on the line 7—7 of FIG. 6.

FIG. 8 is a broken-away, fragmentary, sectional view of a duct with the device of the invention installed in place.

DESCRIPTION OF THE PREFERRED EMBODIMENT OF THE INVENTION

In FIG. 1 there is shown a round, or circular, cross-sectional duct 20, wherein air enters at 21, and exits at 23. Duct 20 has an elbow at 22 and then continues with a straight section at 24.

In normal air flow there is a relatively even cross-sectional distribution of flow within the duct at 25 as the air is traveling along in straight flow. As it enters the bend of the elbow 22, the air tends to pack toward the outside of the elbow at 26 reaching a relatively dense flow at 27 with very little or even reverse flow at 28 at the inside of the elbow. The air then takes a relatively long period of time to again achieve a relatively even cross-sectional flow, or uniform cross-sectional flow at 29.

Referring to FIGS. 3a to 3d, there is shown in graph form an illustration of flow within the duct of FIG. 1. The vertical axis corresponds to points on the diameter of the duct, from top to bottom. The velocity of air flow is shown on the horizontal axis of the graph, in feet per minute. It will be seen from the graphs that at location 3a—3a of FIG. 1, there is actually a negative air flow wherein there is a tendency of the air to reverse itself and flow backwards in a turbulent fashion. The maximum air flow is towards the outside of the elbow wherein there is in the illustrated example a flow of 2500 ft. per minute. At location 3b—3b, the air flow at the upper portion of the duct in FIG. 1 has now become a positive flow but only slightly so with the air flow at the lower portion of the duct at 3b—3b as viewed in FIG. 1 decreasing to about 2200 ft. per minute. At 3c—3c, the air flow at the upper portion of the duct has increased to about 500 ft. per minute while the air flow at the lower portion of the duct has decreased to about 1700 ft. per minute. There is still at location 3c—3c of FIG. 1 substantial non-uniform air flow as shown in the chart. At point 3d—3d, the flow at the top of the duct has increased to over 1100 ft. while the flow at the lower portion of the duct is in the area of 1800 ft. per minute. There is still somewhat of a non-uniform flow even as far down the duct as at 3d—3d.

Referring now to FIG. 2, wherein the device 30 of the invention is inserted at the elbow outlet at 31, the air again enters at 32, the same as in FIG. 1, in a relatively uniform cross section. As the air enters the elbow at 33 in FIG. 2, the air begins to pack the same as in FIG. 1. At 35 the air is packed in the outside of the elbow and the cross-sectional distribution of the flow is identical to that of FIG. 1; that is, the air is packed on the outside of the elbow with very little or even reverse flow on the inside of the elbow, in the form of turbulence. As the air passes through the device 30 of the invention, it is directed back toward the longitudinal center of the duct so that at 4a—4a the air flow and velocity distribution is as shown in the graph of FIG. 4a.

It will be seen that the flow at the lower portion of the duct at point 4a—4a of FIG. 2 is in the area of 2400 ft. per minute while at the top there is a negative flow of about 450 ft. per minute, indicating a negative or turbulent relationship. At point 4b—4b of FIG. 2, as seen in the graph of FIG. 4a, the recovery toward uniform flow is substantial compared to that of FIG. 1. There is no negative flow at the upper portion of the duct and in fact there is a substantial recovery at this point wherein as seen from the graph, the air flow at the center of the duct is in the area of 2000 ft. per minute with relatively symmetrical decline in flow toward the upper and lower portion of the duct. In FIG. 4c, there is shown virtually full recovery for uniform cross-sectional air flow, at point 4c—4c of FIG. 2. In FIG. 4d, there is shown a continued improvement in cross-sectional flow at point 4d—4d in FIG. 2.

It can be readily seen by comparing FIGS. 3a-3d to FIGS. 4a-4d that there is a substantial increase in recovery to uniform cross-sectional flow in a much shorter length of duct. As indicated above in the Summary of the Invention and the Background of the Invention, this is a most desirable result since a sensing mechanism such as a pitot tube, which depends on uniform and predictable air flow at a given cross section of the duct, can be inserted for instance at point 4c—4c or even 4b—4b, if necessary, of FIG. 2. This permits a terminal box for example to be placed close to the elbow, for instance at 4c—4c or even 4b—4b in FIG. 2, whereas it would be necessary to place the terminal box or the like at 3d—3d in FIG. 1 without the device of the invention.

Referring now to FIGS. 5 through 8, it will be seen that the honeycombed material 40 of which the air straightener 30 is formed is of a hexagonal cell material. The thin web or cell walls of honeycomb provide an array of straight tubes or passages with a maximum percent open area (95 to 99%), which results in very low pressure drop. Cell sizes range from ⅛ to ¾ inch; foil gauges can be from less than one mill up to six mil.

Such honeycomb material is readily commercially available in flat panel form.

The air straightening device 30 of the invention is a segment of a spherical surface and has dimensions as seen in FIG. 5. The radius of curvature 45 of the segment is equal to the diameter 46 of the duct in which the device is inserted. Each of the cells 41 of honeycomb 40 have a focus at a point 47. The cells or passages 41 thus all have their longitudinal axes intersecting at the focal point 47. Thus, as air passes through device 30 as seen in FIG. 2, and particularly the packed air at the outside of the bend, the air is directed in going through the passages toward the center, or the longitudinal axis of the ductwork. In effect there is a focusing action of the air, or directing action of the air, toward the center of the duct wherein rapid recovery toward a uniform and predictable cross section is obtained.

The device 30 is of an overall size or diameter wherein it fits entirely within the duct and is circular at its perimeter 48. The device is suitably held within the ductwork as seen in FIG. 8 by clamps 50 which are riveted or otherwise secured at 51 to the duct wall. The clamps or brackets 50 can have a first portion 52 which secures the device 30 on one side and a tab 53 which secures the device 30 on the other side to form a clamping effect.

The device 30 is always positioned downstream of the turn so that the focal point 47 is downstream of device 30; that is so that the convex face of the segment faces upstream.

It will be seen that in operation the device takes air which is on the downstream side of a turn, and is packed on the outside of the turn, wherein there is substantial non-uniform cross-sectional flow and directs or reorients this air by virtue of a focusing action into a relatively uniform and predictable cross-sectional flow in a short run of longitudinal duct. It achieves this by using the honeycomb passages to direct air toward a point along the longitudinal center line of the duct. This focusing of the longitudinal directions of the passages is achieved by use of a spherical segment of honeycomb. Thus a uniform cross-sectional and predictable flow is achieved relatively rapidly in the ductwork after a turn wherein sensing devices can be placed to determine air flow which is subsequently used to operate mixing boxes and the like.

It should be understood that the device of the invention can be used anywhere that it is desirable to reduce turbulence after a bend in the ductwork. For instance, turbulence often creates noise, and the present invention may be used, with or without a sound attenuator, to reduce such noise.

The device of the invention may be formed from flat, commercially procurable honeycomb material, which is formed into a spherical shape by pressing with a suitable punch and die, preferably wooden. The shape of the punch and die conform to the desired spherical form.

In view of our invention and disclosure, variations and modifications to meet individual whim or particular need will doubtless become evident to others skilled in the art, to obtain all or part of the benefits of our invention without copying the structure shown, and we, therefore, claim all such insofar as they fall within the reasonable spirit and scope of our claims.

What we claim as new and desire to secure as Letters Patent is:

1. A device
   (a) for insertion in an air duct having
      (1) air flow, and
      (2) a longitudinal center line,
   (b) to reduce turbulence and provide uniform cross-sectional air flow downstream of the device, comprising
   (a) a honeycomb material having a plurality of passages, wherein
   (b) the honeycomb material is in the form of a spherical segment, and
   (c) the passages focus at a point on the duct center line downstream of the device when inserted in a duct.

2. A device of claim 1 wherein the duct is round in cross section and the radius of curvature of the spherical segment is equal to the diameter of the duct.

* * * * *